United States Patent [19]

Vary

[11] 4,436,480

[45] Mar. 13, 1984

[54] HYDRO-TURBINE DEVICE FOR GENERATING ELECTRICITY

[76] Inventor: Philip Vary, 100 SW. Hideaway, Stuart, Fla. 33494

[21] Appl. No.: 391,471

[22] Filed: Jun. 23, 1982

[51] Int. Cl.³ ............................................. F03B 7/00
[52] U.S. Cl. .................................................. 415/2 R
[58] Field of Search ............................... 415/2 R–4 R

[56] References Cited

U.S. PATENT DOCUMENTS

| | | |
|---|---|---|
| 326,718 | 9/1885 | Collins . |
| 674,042 | 5/1901 | Springer . |
| 772,786 | 10/1904 | Clifford . |
| 984,025 | 2/1911 | Rhodes ............................ 415/7 X |
| 1,023,378 | 4/1912 | Hay ............................ 416/139 A X |
| 1,120,930 | 12/1914 | Goss et al. ................... 416/197 A X |
| 1,143,803 | 6/1915 | Benbow . |
| 1,200,308 | 10/1916 | Bunnell . |
| 1,326,769 | 12/1919 | Munn . |
| 1,662,937 | 3/1928 | Ramsdell .................... 416/197 A X |
| 1,810,113 | 6/1931 | Scholtzhauer . |
| 2,310,816 | 2/1943 | Taylor ............................ 415/2 R X |
| 3,883,261 | 5/1975 | Saxmann ...................... 415/2 R X |
| 3,938,907 | 2/1976 | Magoveny . |
| 4,053,787 | 10/1977 | Diggs . |
| 4,057,270 | 11/1977 | Lebost . |
| 4,104,536 | 8/1978 | Gutsfeld . |
| 4,137,005 | 1/1979 | Comstock .................... 415/3 R X |
| 4,260,325 | 4/1981 | Cymara . |
| 4,278,896 | 7/1981 | McFarland . |
| 4,295,783 | 10/1981 | Lebost . |

FOREIGN PATENT DOCUMENTS

| | | | |
|---|---|---|---|
| 2600627 | 7/1977 | Fed. Rep. of Germany | ..... 415/2 R |
| 2719651 | 11/1978 | Fed. Rep. of Germany | ..... 415/4 R |
| 2743201 | 5/1979 | Fed. Rep. of Germany | ..... 415/2 R |
| 900038 | 6/1945 | France | ............................ 416/197 A |

Primary Examiner—Everette A. Powell, Jr.
Attorney, Agent, or Firm—Francis B. Francois; Francis D. Thomas, Jr.

[57] ABSTRACT

A hydro-turbine device includes a frame mounted in a channel through which water flows, the frame mounting a horizontal shaft carrying a turbine wheel having spaced end plates between which extend a plurality of arcuate vanes. A cover is mounted over the rear of the turbine wheel, and carries an extension on the front thereof that has an arcuate scoop mounted on its under side. The arcuate scoop is arranged to capture water flowing toward the turbine wheel and direct it centrally against the concave rear faces of the vanes, so as to effect maximum energy removal from the water. The cover is positioned and arranged to enhance aspirator action for efficiently removing spent water from the turbine wheel.

4 Claims, 4 Drawing Figures

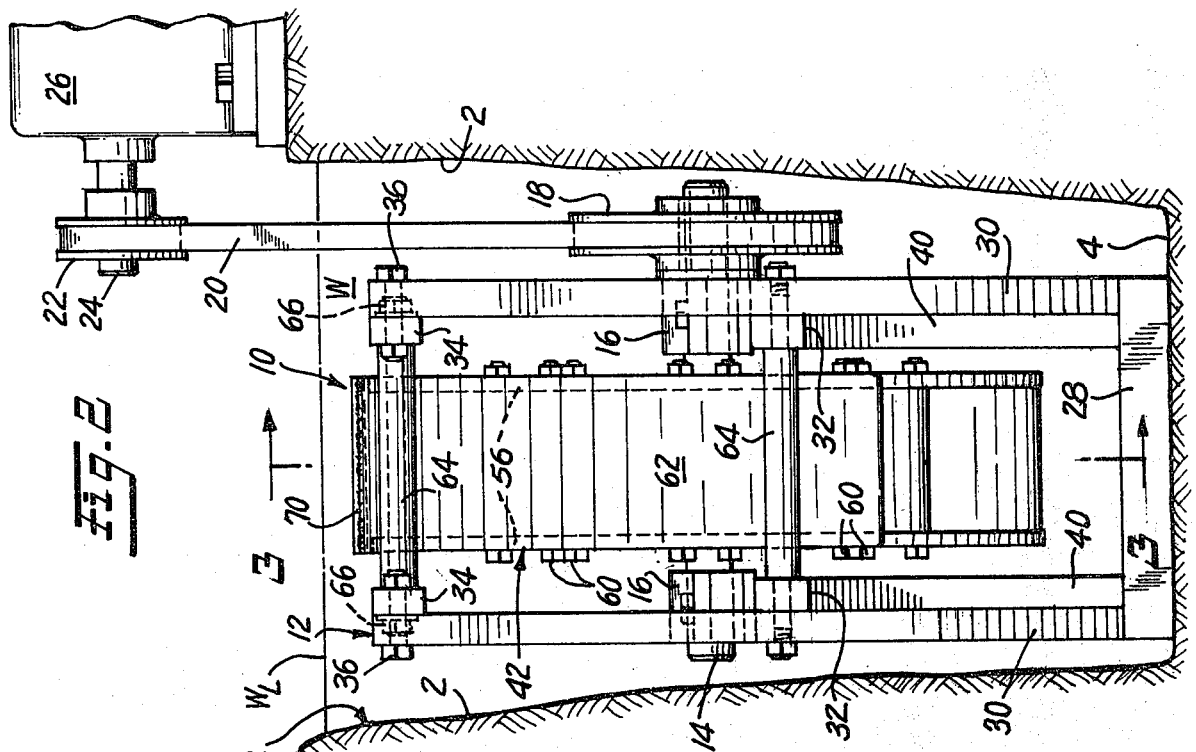
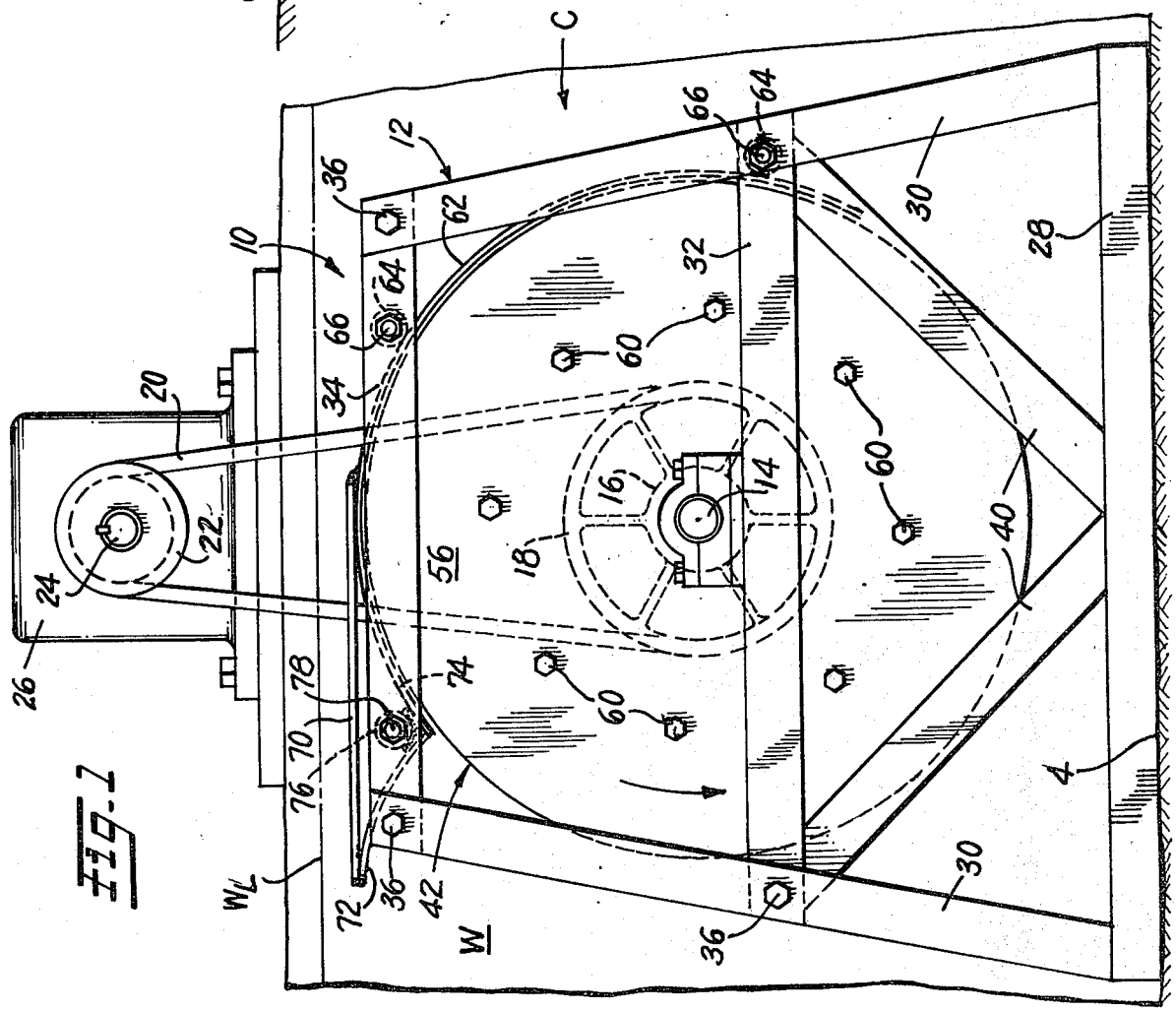

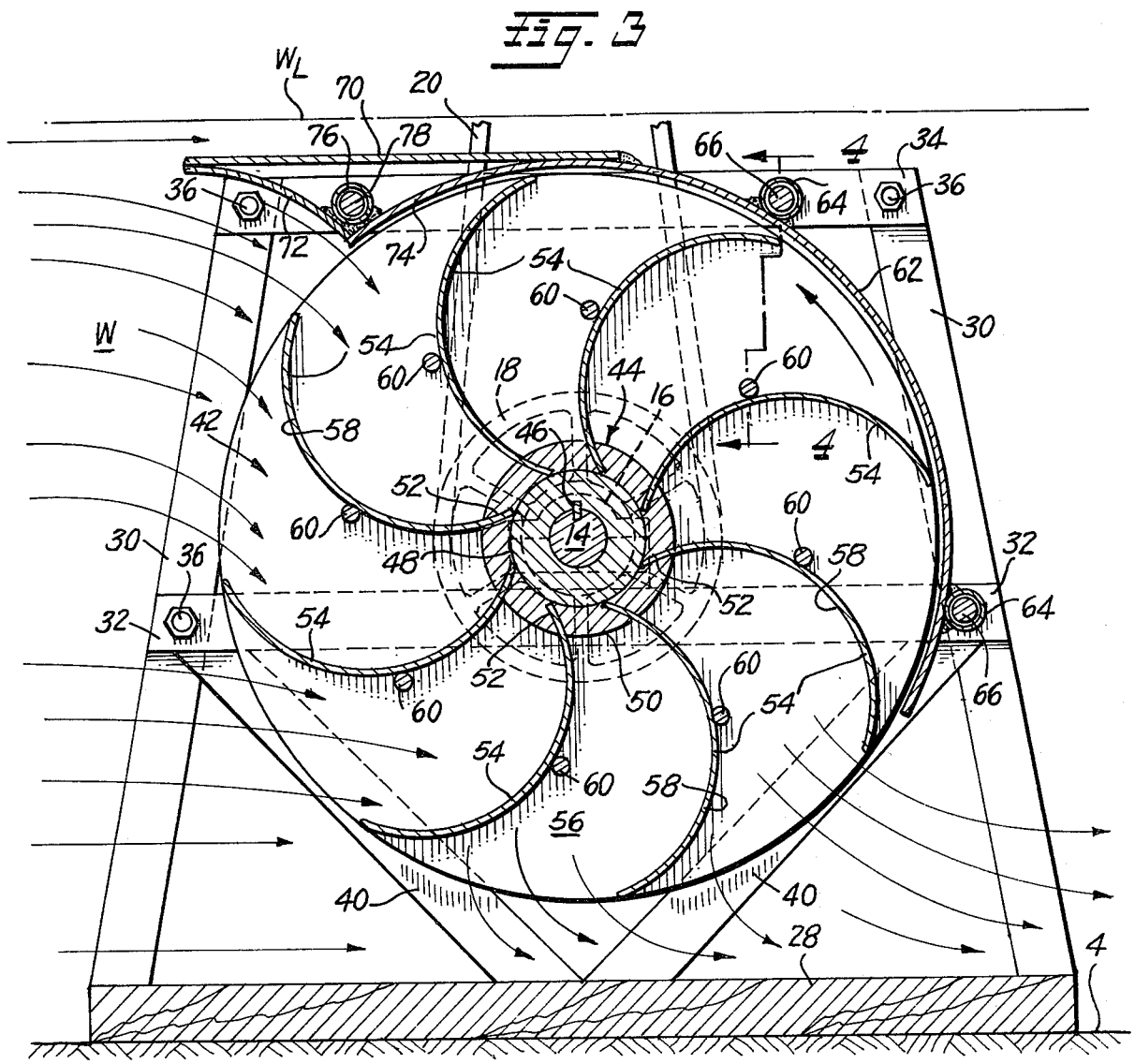
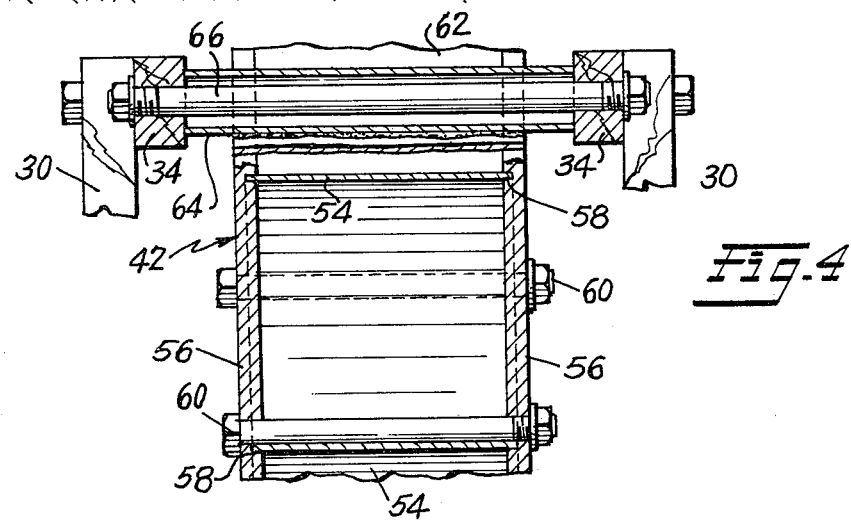

HYDRO-TURBINE DEVICE FOR GENERATING ELECTRICITY

TECHNICAL FIELD OF THE INVENTION

The present invention relates generally to hydro-turbine devices for placement into a channel having water flowing therethrough, and which are constructed to drive a generator to produce electricity. More particularly, it relates to an improved and economical way to construct hydro-turbine devices, designed to maximize the recovery of energy from a flowing stream of water.

BACKGROUND OF THE INVENTION

The use of water-driven turbine devices for generating electricity is known, and over the past decades a number of designs for hydro-turbines have been produced. Among such known devices is that which is the subject of my own U.S. Pat. No. 3,980,984, and that shown in prior U.S. Pat. No. 1,326,769. In such devices the flowing water impinges on the blades or vanes of a turbine wheel, causing the wheel to rotate. This rotation is then utilized to drive the input shaft of a generator unit. In this age of energy shortage such a hydro-turbine device is of great utility, but thus far a fully satisfactory device of this type has not been made available.

To be of truly significant value, such a hydro-turbine device must be designed to convert the maximum amount of energy in the flowing water to electricity. While water wheels have been known for untold generations and hydro-turbine units for decades, they have not been designed with the thought of maximum energy recovery in mind. There is thus need for a hydro-turbine device that is economical to construct, and which will extract the maximum amount of energy from water flowing thereover. The present invention is intended to satisfy that need.

BRIEF SUMMARY OF THE INVENTION

The hydro-turbine device of the invention includes a turbine wheel that is mounted in a suitable frame, the frame being designed to support the turbine wheel in a channel through which water flows. The turbine wheel is mounted on a shaft, and includes a hub, spaced end plates, and a plurality of arcuate vanes mounted in slots in the end plates and the hub. When the frame is properly positioned in the channel, the arcuate vanes are positioned to be struck by the oncoming flow of water.

The invention features a cover means mounted over the rear of the turbine wheel, arranged to prevent the back sides of the turbine vanes from being struck by the oncoming water. The arrangement is somewhat similar in concept to what is shown in FIG. 7 of my U.S. Pat. No. 3,980,894, but the present invention is intended to operate differently and more efficiently than the arrangement of FIG. 7 and includes additional important features.

The cover means of the invention extends from the top of the turbine wheel rearwardly and downwardly over an arc length of about 120°, and a forwardly directed extension projects horizontally from the top of the cover means. An arcuate scoop is connected to the forward edge of the extension, and extends rearwardly and downwardly toward the turbine wheel. The scoop is positioned to capture water flowing toward the wheel, and direct it centrally against the concave rear face of each arcuate vane as the vane moves downwardly between about 30 and 60 degrees from the vertical. The presence and arrangement of this scoop, coupled with the cover means, helps assure that the present hydro-turbine device will recover the maximum energy from the flowing water.

The frame that carries the turbine wheel and the cover means is positioned so that the water flowing in the channel will impinge directly on the scoop and the rear concave surfaces of the exposed vanes, and also so that water will flow underneath the turbine wheel. The wheel is constructed to take advantage of the flow of water thereunder, to further enhance its energy efficiency.

As has been noted, the cover means has an arc length of about 120° measured downwardly from the top of the turbine wheel, so that it terminates above the bottom of the wheel. This leaves the bottom and a portion of the lower back of the turbine wheel exposed. As a result, as the flowing water passes underneath the turbine wheel, it tends to remove spent water from the vanes as they move upwardly from their bottom-most position, through an aspirator-like action. This assures that essentially all water is removed from the vanes shortly after the energy of the water has been utilized, so that the weight of the spent water does not act negatively on the turbine wheel's efficiency.

The overall combination of the cover means, the forward extension and the scoop carried thereby, and the aspirator action of the flowing water combine to provide the maximum energy recovery characteristics for the present hydro-turbine device. The shaft upon which the turbine wheel is mounted is connected to the input shaft of a suitable generator, which in turn produces electricity as the turbine wheel is rotated.

It is the principal object of the present invention to provide a hydro-turbine device that is easily useable by individuals in a domestic or business setting, and in communities, to generate electricity from flowing water, and which is designed so as to maximize the recovery of energy from the water flowing thereover.

Another object is to provide a hydro-turbine device that is economical to construct, and easy to install and maintain.

A further object is to provide a turbine wheel that is rugged in construction, but which can be easily manufactured.

Yet another object is to provide a hydro-turbine device provided with a scoop arrangement designed to so direct the water flow as to assure maximum energy recovery.

Other objects and many of the attendant advantages of the invention will become readily apparent from the following Description of the Preferred Embodiment, when taken in conjunction with the accompanying drawings.

BRIEF DESCRIPTION OF THE DRAWINGS

FIG. 1 is a side elevational view of the hydro-turbine device of the invention, installed in a channel so that water flows both over and under the turbine wheel of the device;

FIG. 2 is an end elevational view of the hydro-turbine device of FIG. 1, as viewed from the right or rear side thereof;

FIG. 3 is an enlarged fragmentary vertical sectional view taken on the line 3—3 of FIG. 2, and shows the arrangement of the forward extension, the scoop, and the cover means relative to the turbine wheel, with the direction of water flow being indicated by arrows; and FIG. 4 is an enlarged, fragmentary vertical sectional view taken on the staggered section line 4—4 of FIG. 3, showing the manner in which the ends of the vanes are seated in the turbine wheel end plates.

DESCRIPTION OF THE PREFERRED EMBODIMENT

Referring now to the drawings, a channel is indicated at C and includes side walls 2 and a bottom 4, the channel being supplied with water W that flows therethrough and has a level WL that nearly fills the channel. It is to be understood that the channel C as shown is merely an example of a typical channel, and that in fact the invention can be used with channels of different shapes and depth, both earthen and those which are formed of concrete, stone, metal and other materials.

Mounted within the channel C is the hydro-turbine 10 of the invention, which includes a frame 12 upon which a shaft 14 is mounted by suitable bearing units 16 to extend transversely of the water flow. One end of the shaft 14 has a pulley 18 thereon, and a belt 20 passes over it and leads to a pulley 22 mounted on the input shaft 24 of a suitable generator unit 26.

The frame 12 can in fact be of any suitable design that will properly mount the shaft 14 in the channel C. The frame 12 as shown in the drawings is designed to sit on the bottom 4 of the channel C, but other arrangements are possible. For example, a frame can also be constructed which would suspend the shaft 14 down into the channel. The invention is therefore not to be limited to the specific design of the frame 12 as shown and described herein, but rather is to include any similar suitable frame arrangement.

As to the frame 12, such includes a base plate 28 that rests upon the channel bottom 4, and which has upright, inclined members 30 on its opposite sides that are connected by middle and upper cross members 32 and 34, respectively. The upright members 30 are connected across the frame by bolts 36, and the bearing units 15 are mounted in alignment with each other on the middle cross members 32. Rigidity is added to the frame 12 by angled braces 40.

The shaft 14 carries a turbine wheel 42, which includes a hub member 44 that is mounted on the shaft and fastened thereto by a key 46. The hub member 44 includes inner and outer members 48 and 50 that are secured to rotate with each other, the outer member 50 having a plurality of axially extending, arcuate slots 52 formed therein to receive the inner ends of arcuate vane members 54.

The turbine wheel 42 also includes circular end plates 56, the end plates having central bores therethrough to receive the shaft 14 and having arcuate grooves 58 cut into their confronting faces to seat the opposite side edges of the arcuate vane members 54. The end plates 56 and the arcuate vane members 54 are held in assembled relationship by transverse connecting bolts 60.

The construction of the turbine wheel 42 is thus simple, and yet the resultant wheel is quite strong. The arcuate vane members 54 will typically be made of sheet metal, or any other suitable material, and because they are seated in the arcuate slots 52 and grooves 58, are quite rigid and strong, and can withstand relatively large water pressures over a long period of time. Further, the design of the turbine wheel 42 allows easy disassembly for maintenance.

The relative proportions of the elements comprising the turbine wheel 42 contribute to its efficient operation, it being desirable that the vanes 54 be spaced apart sufficiently to assure that a relatively large volume of water can be captured thereby, and that there are sufficient vanes to assure a smoothly running hydro-turbine device that will extract the maximum energy from the flowing water. It has been found that eight equally-spaced vanes provide good results, but the number of vanes can be varied somewhat. Typically, if the end plates 56 have a diameter of about twenty-four inches, then the hub member 44 should be about five to six inches in diameter. Obviously, these dimensions can be varied and scaled up or down, depending upon the demands or desires of the user. The width of the turbine wheel 42 is also a matter of choice, and is related to the width of the channel C, the volume of the flowing water, and the amount of electrical energy to be generated.

Mounted over the rear, upper side of the turbine wheel 42 is an arcuate cover member 62, which extends rearwardly and downwardly from the top of the wheel from about 120°. The cover member 62 is spaced closely to the outer ends of the vanes 54, and has mounting tubes 64 welded to the exterior thereof through which mounting bolts 66 pass, the bolts 66 being engaged with the frame 12. The cover member 62 prevents water approaching the turbine wheel from prematurely striking the forwardly rotating vanes 54 on the upper half of the wheel.

The top of the cover member 62 has a horizontal, forwardly directed extension plate 70 secured tangentially thereto, the forward edge of which extends to the maximum diameter of the turbine wheel 42. Mounted on the forward edge of the horizontal extension plate 70 is an arcuate scoop member 72, which curves inwardly and downwardly and terminates just outwardly of the diameter of the turbine wheel 42 at a point about 30° from the vertical. An extension 74 of the cover member 62 connects with the lower end of the scoop 70, and a mounting tube 76 is mounted on the outer side of the scoop 70 and receives a bolt 78 that rigidly mounts the scoop in position.

The scoop member 70 functions to capture water flowing toward the turbine wheel 42 and direct it behind each of the rotating vanes 54, while the vanes are moving downwardly between about 30 and 60 degrees from the vertical. This unique arrangement dumps water behind the rotating vanes at the earliest advantageous moment, since normally water would not effectively act on the vanes until they are about to their horizontal position. The effect of this early water impact is to significantly increase the energy recovery of the hydro-turbine device of the invention over anything heretofore known, and thus the scoop and its arrangement are an important element of the invention.

The arcuate shape of the vanes 54 is chosen to assure maximum dispersion and non-disruptive flow of the incoming water, as it impacts upon the concave surfaces of the vanes. Similarly, the arcuate shape of the scoop member 70 is chosen to direct a maximum volume of water directly at the center areas of the concave vane surfaces, as they rotate past the scoop. The cover member 62 functions to prevent water from impinging prematurely on the upcoming rotating vanes 54, and the resulting combination of the cover member 62 and the scoop member 70 assure maximum recovery of energy from the oncoming water.

In order to further increase the efficiency of the hydro-turbine device of the invention, the device is arranged to assure that utilized water will be promptly removed from the turbine wheel. This eliminates a source of drag, and ensures that the maximum amount of recovered energy will be applied to rotate the shaft 14 and drive the generator 26. Removal of spent water is obtained by a combination of terminating the cover member 64 at a point below the horizontal on the back side of the turbine wheel 42, say about 30° from the horizontal, and by mounting the shaft 14 so that a substantial quantity of water W flows beneath the turbine wheel. The flow of water beneath the turbine wheel 42 will then function like an aspirator to draw spent water from the rotating vanes 54, before they move upwardly into the cover member 62.

The result of the unique design of the present invention is to provide for the maximum recovery of energy from flowing water, and to minimize energy losses caused by carrying spent water. But at the same time, the hydro-turbine device of the invention is easy to construct and install and thus can be utilized in domestic and small business settings, and in communities, where a minimum of mechanical and electrical ability is required for installation and maintenance.

In some instances, small streams can be directly utilized with the hydro-turbine device of the invention by installing it in the nature stream channel. In other cases, special channels may be desirable, incorporating sluices and other similar arrangements for properly channeling water flow. The amount of electric power ultimately generated will depend on the physical dimensions chosen for the hydro-turbine device, the volume and flow velocity of the water, and other factors. Further a multiplicity of the hydro-turbine devices of the invention can be utilized, if desired. In all cases, full advantage is taken of naturally flowing water, dischares from hydro-turbines, the ebbs and flows of tides and similar water movements to generate electricity without causing pollution, harming the environment or impairing landscapes, and with maximum energy recovery assured because of the unique design of the invention.

While various changes can be made in detailed constructions of the invention, it is understood that such changes will be within the spirit and scope of the invention as it is defined by the appended claims.

I claim:

1. A hydro-turbine device for generating electricity from the flow of water through a channel, comprising:
    frame means mountable in said channel;
    a horizontal, rotatable shaft carried by said frame means and disposed to extend transversely of the direction of water flow through said channel, said shaft being adapted to be connected to generator means;
    hub means mounted on said shaft;
    a pair of spaced end plates received on said shaft, said hub means extending between said end plates;
    at least six equally spaced vanes fixedly mounted to extend between said end plates parallel with said shaft, said vanes extending radially from said hub means and being curved so that the rear faces thereof are concave;
    said end plates, said hub means and said vanes forming a turbine wheel disposed so that the front thereof faces water flowing through said channel and so that the rear faces of said vanes are exposed to said flowing water as they move downwardly from the top toward the bottom of said wheel;
    cover means mounted over the rear of said turbine wheel, said cover means being carried by said frame means and extending from the top of said wheel rearwardly and downwardly to a termination point spaced upwardly from the bottom of the wheel but below a horizontal plane containing the axis of said shaft;
    an extension on said cover means extending forwardly generally tangentially from the top of said wheel, the forward edge thereof being positioned generally above the forward edge of said turbine wheel; and
    an arcuate scoop mounted on said extension and extending downwardly and rearwardly from the forward edge thereof toward and nearly into engagement with said vanes of said turbine wheel, the inner, lower edge of said arcuate scoop being positioned about 30 degrees removed from a vertical plane containing said shaft, said scoop serving to capture water flowing toward said wheel and direct it centrally against the concave rear face of each vane as the vane moves downwardly between about 30 and 60 degrees from said vertical position;
    said frame means being arranged to mount said shaft so that the bottom of said turbine wheel is spaced above the bottom of said channel so that a substantial flow of water passes under the wheel, said water flowing under the turbine wheel being effective to remove spent water from behind the vanes in the region between the bottom of said wheel and the bottom edge of said cover means, through aspirator-like action.

2. A hydro-turbine device as recited in claim 1, wherein said scoop includes an arcuate portion that extends upwardly and rearwardly from the inward edge thereof and which forms an extension of said cover means.

3. A hydro-turbine device as recited in claim 1, wherein said bottom edge of said cover means is positioned about 30° below the horizontal.

4. A hydro-turbine device as recited in claim 1, wherein said hub means has axial slots therein to seat the inner radial edges of said vanes, and wherein the confronting faces of said end plates have grooves therein to seat the side edges of said arcuate vanes.

* * * * *